(12) United States Patent
Lee et al.

(10) Patent No.: US 11,481,392 B2
(45) Date of Patent: Oct. 25, 2022

(54) TRANSFORMATION RECONSTRUCTION FOR OPTIMIZED DATABASE QUERY

(71) Applicant: SAP SE, Walldorf (DE)

(72) Inventors: Boyung Lee, Seoul (KR); Sang Il Song, Seoul (KR); Won Seok Kim, Seoul (KR); Dan Bi Park, Seoul (KR); Heesik Shin, Seoul (KR)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 16/369,773

(22) Filed: Mar. 29, 2019

(65) Prior Publication Data

US 2020/0311074 A1 Oct. 1, 2020

(51) Int. Cl.
  *G06F 16/00* (2019.01)
  *G06F 16/2453* (2019.01)
  *G06F 16/25* (2019.01)

(52) U.S. Cl.
  CPC ...... *G06F 16/24534* (2019.01); *G06F 16/252* (2019.01)

(58) Field of Classification Search
  CPC ............ G06F 16/24534; G06F 16/252; G06F 16/24542
  USPC .......................................... 707/600–899, 713
  See application file for complete search history.

(56) References Cited

U.S. PATENT DOCUMENTS

| | | | |
|---|---|---|---|
| 6,944,614 B1* | 9/2005 | Ramasamy | G06F 16/21 |
| 2003/0093647 A1* | 5/2003 | Mogi | G06F 16/24542 |
| 2006/0074874 A1* | 4/2006 | Day | G06F 16/24549 |
| 2009/0106219 A1* | 4/2009 | Belknap | G06F 16/24542 |
| 2020/0110827 A1* | 4/2020 | Freedman | G06F 16/24542 |
| 2020/0285643 A1* | 9/2020 | Kadiam | G06F 16/24542 |

\* cited by examiner

*Primary Examiner* — Irete F Ehichioya
*Assistant Examiner* — Shirley D Hicks
(74) *Attorney, Agent, or Firm* — Buckley, Maschoff & Talwalkar LLC

(57) ABSTRACT

Provided is a system and method for reconstructing and visualizing transformation steps that are performed to an optimized database query. In one example, the method may include receiving a database query including an initial set of execution steps, generating a plurality of alternative sets of execution steps for the database query based on transformations to the initial set of execution steps, selecting an alternative set of execution steps from among the plurality of alternative sets of execution steps based on a performance of the alternative set of execution steps, identifying transformations that are used to transform the initial set of execution steps into the selected alternative set of execution steps, and displaying information about the identified transformations via a user interface.

18 Claims, 10 Drawing Sheets

```
*   Initial plan cost estimation time:              1.440 ms
*   Cost-based optimization time:                  14.232 ms
**  Local filter selectivity estimation time:      10.098 ms
**  Join selectivity estimation time:               0.000 ms
**  Number of AGGR_THRU_JOIN:                       8
**  Number of MERGE_DISTINCT_WITH_JOIN:             2
**  Number of JOIN_THRU_AGGR:                       8
**  Number of JOIN_THRU_FILTER:                     4
**  Number of JOIN_THRU_JOIN:                      62
**  Number of FILTER_THRU_JOIN:                     4
**  Number of RS_INDEX_JOIN:                       38
**  Number of RS_HASH_JOIN:                        50
**  Number of RS_RANGE_JOIN:                       50
**  Number of RS_HASHED_RANGE_JOIN:                 4
**  Limit of alternative enumeration:            2000
**  Limit of JOIN_THRU_JOIN enumeration:         1000
**  Number of alternative enumerations:            88  // number of logical enumerations
**  Number of duplicate detections:                52
**  Number of expansions:                          76
**  Number of prunings:                            86
**  Number of index enumerations:                   0
**  Number of TREX search enumerations:             0
**  Number of TREX search allocations:              0
**  Number of ColJoinEstimator calls:               0
**  Number of operator groups:                     45  // number of logical base operators
**  Number of operators:                          133  // number of logical/physical operators
**  Number of plans:                              453
**  Memory pool size:                           1.000 MB
```

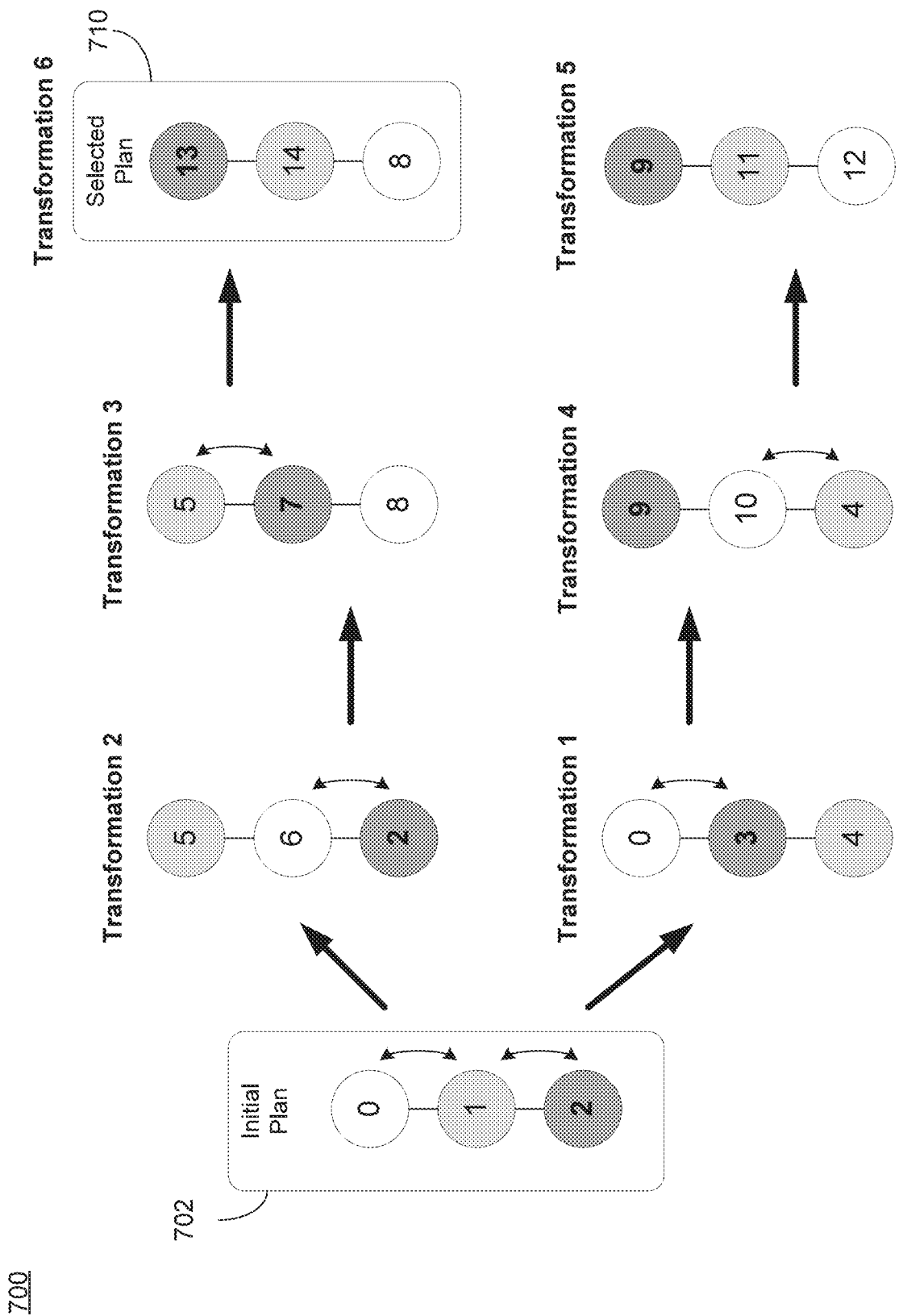

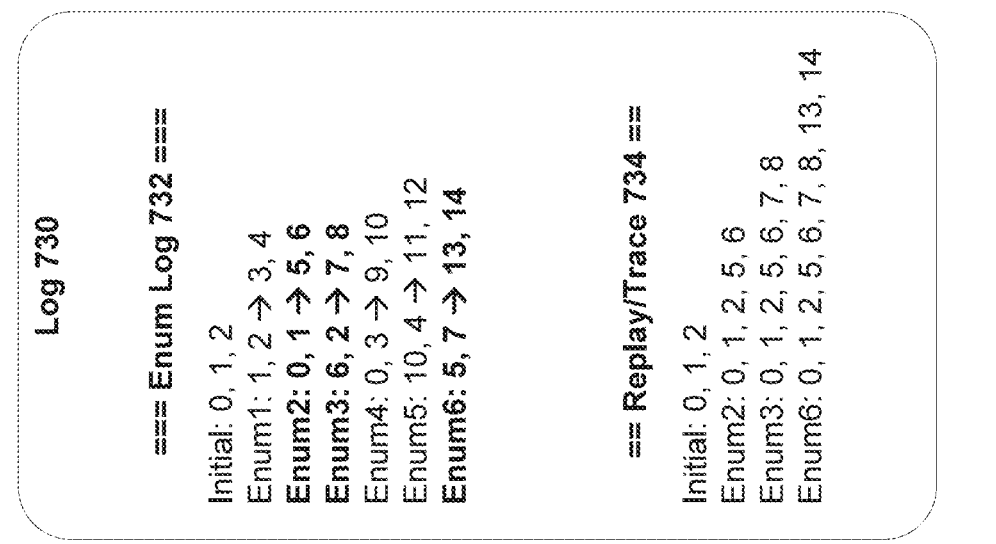
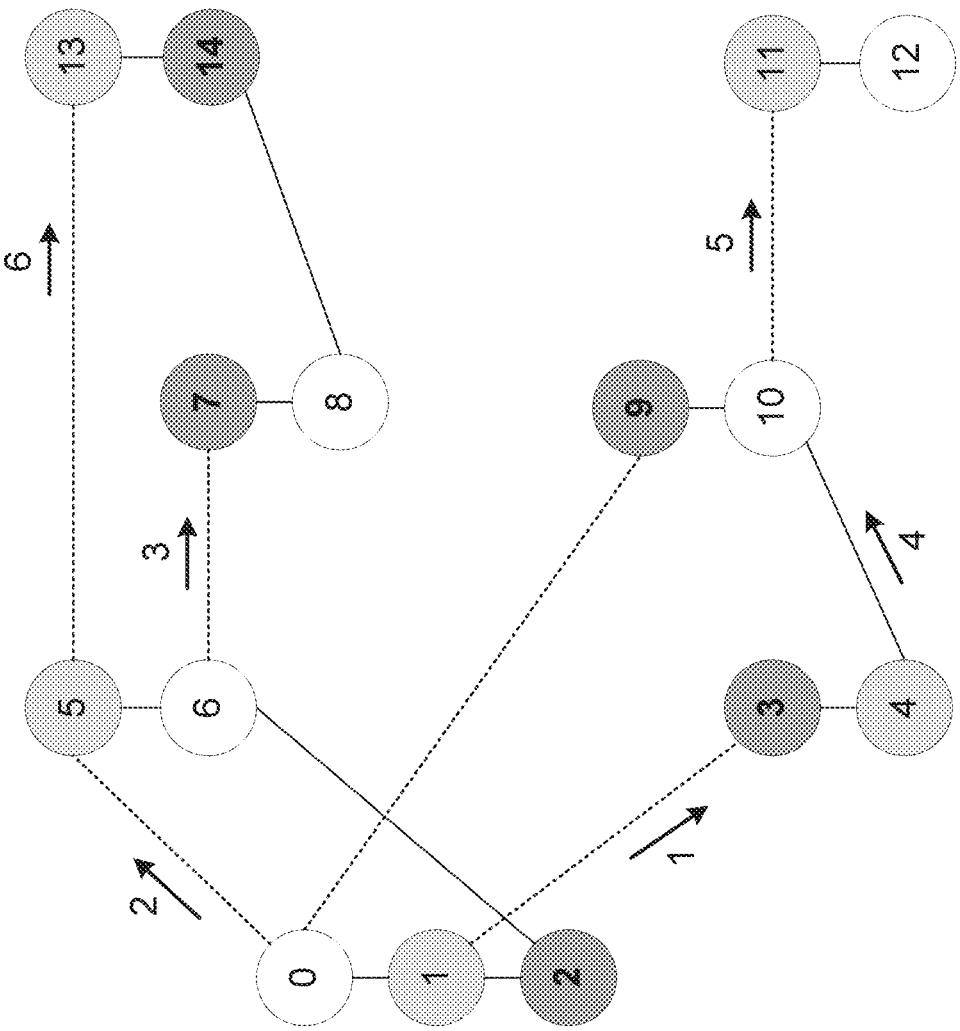
FIG. 7B

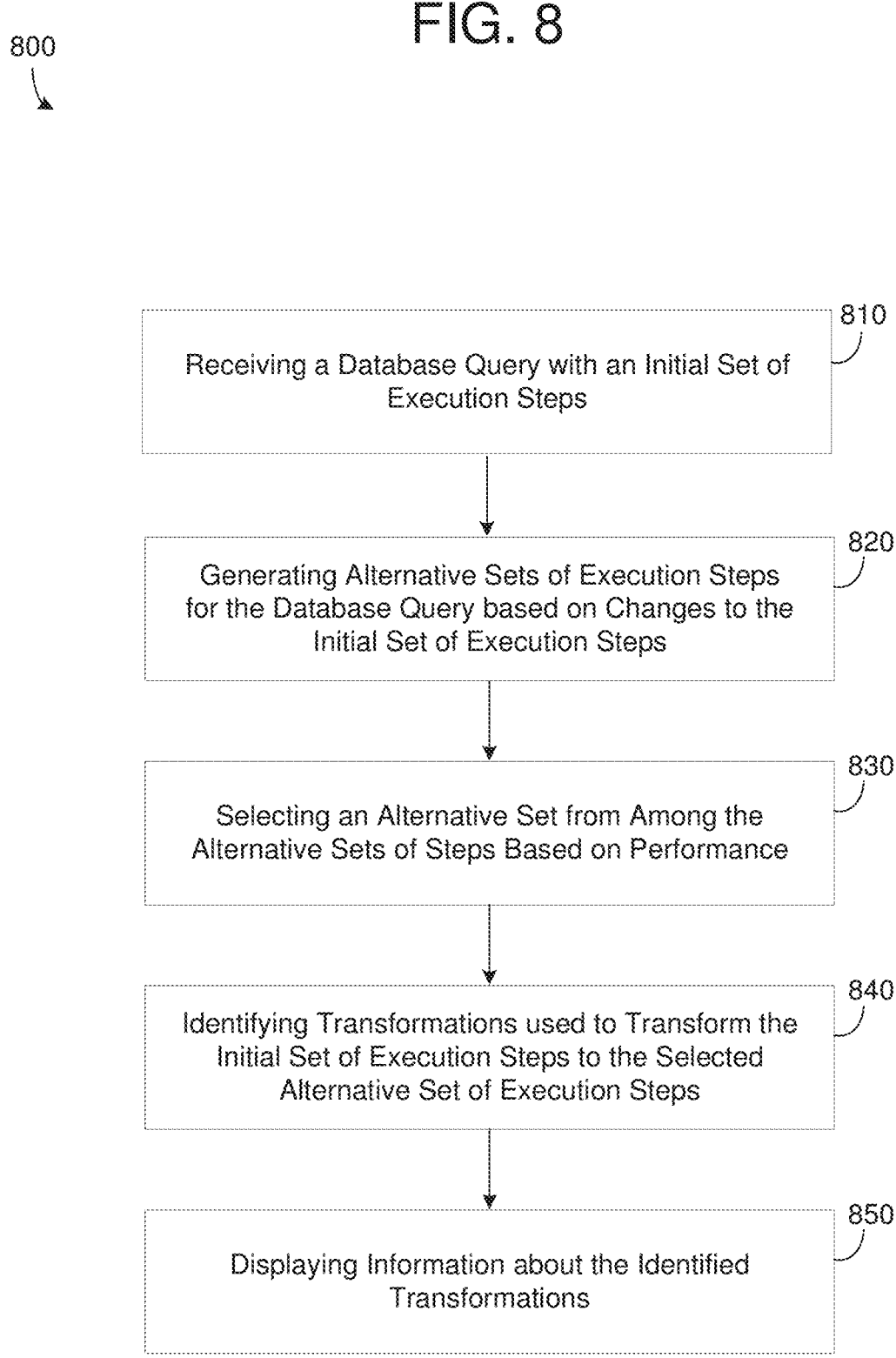

TRANSFORMATION RECONSTRUCTION FOR OPTIMIZED DATABASE QUERY

BACKGROUND

A database query is a mechanism for retrieving data from a database table or a group of database tables. For example, Structured Query Language (SQL) is a declarative querying language that is used to retrieve data from a relational database. In a distributed database system, a program often referred to as a database back-end can run constantly on a server, interpreting data files on the server as a standard relational database. Meanwhile, programs on client computers allow users to manipulate that data, using tables, columns, rows, fields, and the like. To do this, client programs send SQL statements (queries) to the server. The server then processes these statements and returns result sets to the client program.

SQL queries can suffer from performance issues. For example, performance degradation may occur if the database being accessed is not being properly maintained. As another example, the initial query may have a set of execution steps (referred to as a query execution plan or query plan) that is not efficient. Therefore, the database can rewrite (i.e., transform) the query execution plan to make it more efficient during execution. The process of query optimization can be a complex task. For example, a query optimizer may generate hundreds or even thousands of alternative execution plans for the original query before making a selection of an optimal execution plan. Because of this, it can be difficult for an end user (such as a database operator, programmer, etc.) to understand how a particular query optimization was derived.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 5 is a diagram illustrating information that is created during a query optimization process in accordance with an example embodiment.

FIG. 7A is a diagram illustrating different transformation steps that are applied to a query execution plan during query optimization, in accordance with an example embodiment.

FIG. 7B is a diagram illustrating a log storing transformation steps during query optimization, in accordance with an example embodiment.

FIG. 8 is a diagram illustrating a method of generating a visualization of relevant transformations of a database query optimization in accordance with an example embodiment.

Figure 1:
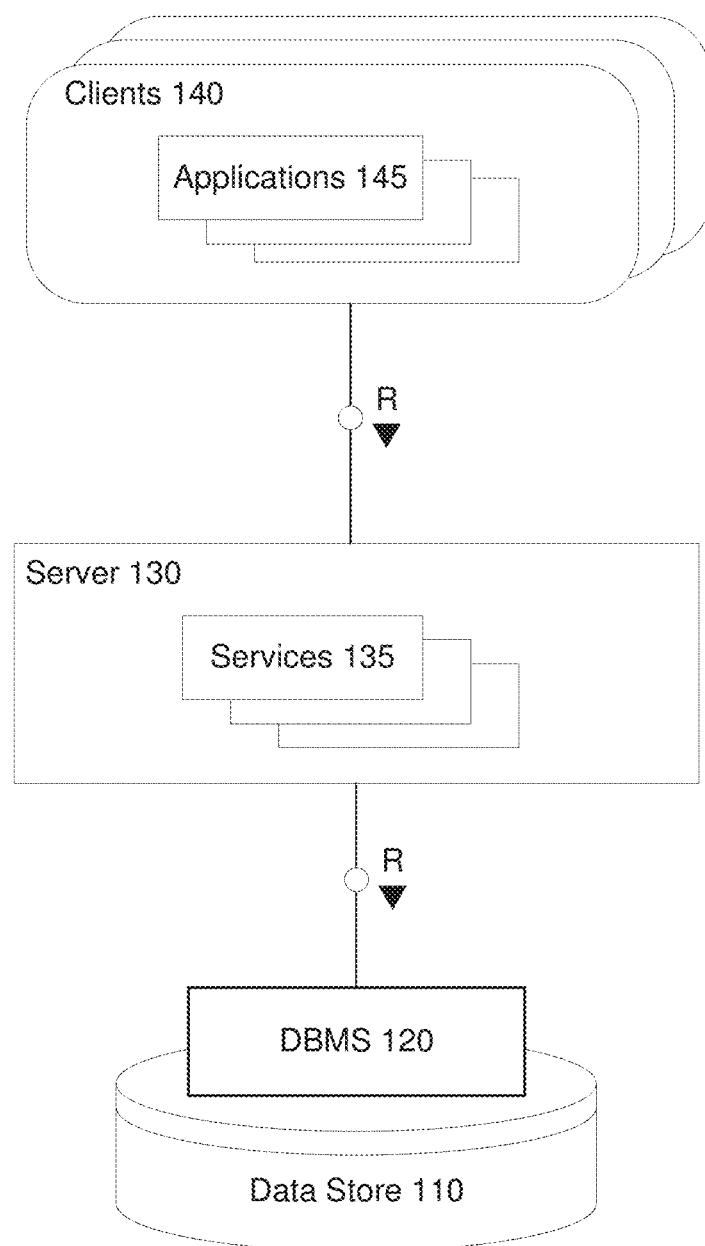
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Query optimization is a process in which a database (e.g., a database management system (DBMS), etc.) attempts to determine a most efficient way to execute a given query by considering alternative query execution plans. A query is a request for information from a database such as tabular data stored in one or more tables in a relational database. The query execution plan is an ordered sequence of execution steps to be performed to collect the data from the database. Because database structures are complex, often the requested data of a query can be collected from the database in different ways, through different data-structures, and/or in different orders. These different ways are referred to herein as alternative query execution plans or simply, alternative plans.

Each alternative query execution plan can have a different processing time. In some cases, the processing times of a same query may have significant variance, from a fraction of a second to minutes or even hours, depending on the alternate query execution plan selected. The purpose of query optimization, which is an automated process, is to find the alternative query execution plan (ordered set of execution steps) to process a given query in minimum time. The large possible variance in time justifies performing query optimization, though finding the exact optimal way to execute a query, among all possibilities, is typically very complex and too time consuming and costly. Thus, query optimization may approximate the optimum execution plan by comparing several dozen or several hundred common-sense alternatives to provide a plan in a reasonable time which typically does not deviate much from the best possible result.

Query optimization relies on various rules (also referred to as enumeration rules) for transforming the initial query execution plan into various alternative execution plans. Queries are often composed of SQL operations. An example of these operations is a join (join statement) which is used to combine data from rows, tables, columns, etc. Different types of joins exist including inner, left, right, and full.

Changing an order of the data accessed by a join, a type of join, and the like, is one example of a query transformation. It may take multiple complex transformations to the initial query to find the most optimal query execution plan. Furthermore, a few hundred other alternative query execution plans may be attempted by the query optimizer before selecting the most optimal alternative query execution plan. Accordingly, it can be very difficult (complex) for a user to understand how the most optimal query execution plan was derived from the initial plan.

The example embodiments provide a system which can reconstruct the relevant transformation steps used to create a most optimal alternative query execution plan from an initial logical plan of a database query. The system can use a log to trace the different alternative execution plans and provide unique identifiers to each transformation allowing the system to reconstruct the steps taken to create an alternative query execution plan from the initial logical plan. The log may be a runtime object which stores data associated with the enumerations. The optimizer can use various rules (also referred to as enumeration rules) to create the different transformations. The log may store each of these enumerations in the order they were performed as well as the unique identifiers of each transformation which can be linked together to reconstruct the set of transformations for the alternative query execution plan. Furthermore, the system may display only those relevant transformations via a user interface. Here, the relevant transformations may include only those transformations that are used to create the selected alternative execution plan, while preventing other transformations (of other unselected alternative plans) from being displayed.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the application 145 creates a report/visualization based on the result set. In this example, DBMS 120 may perform a query optimization on the SQL query to determine a most optimal alternative query execution plan. The reconstruction and visualization of the transformations of an optimized query described according to example embodiments may be performed by the DBMS 120, or the like.

An application 145 and/or a service 135 may be used to identify and combine features for training a machine learning model. Raw data from various sources may be stored in the data store 110. In this example, the application 145 and/or the service 135 may extract core features from the raw data and also derive features from the core features. The features may be stored as database tables within the data store 110. For example, a feature may be assigned to its own table with one or more columns of data. In one example, the features may be observed as numerical values. Furthermore, the application 145 and/or the service 135 may merge or otherwise combine features based on a vertical union function. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2:
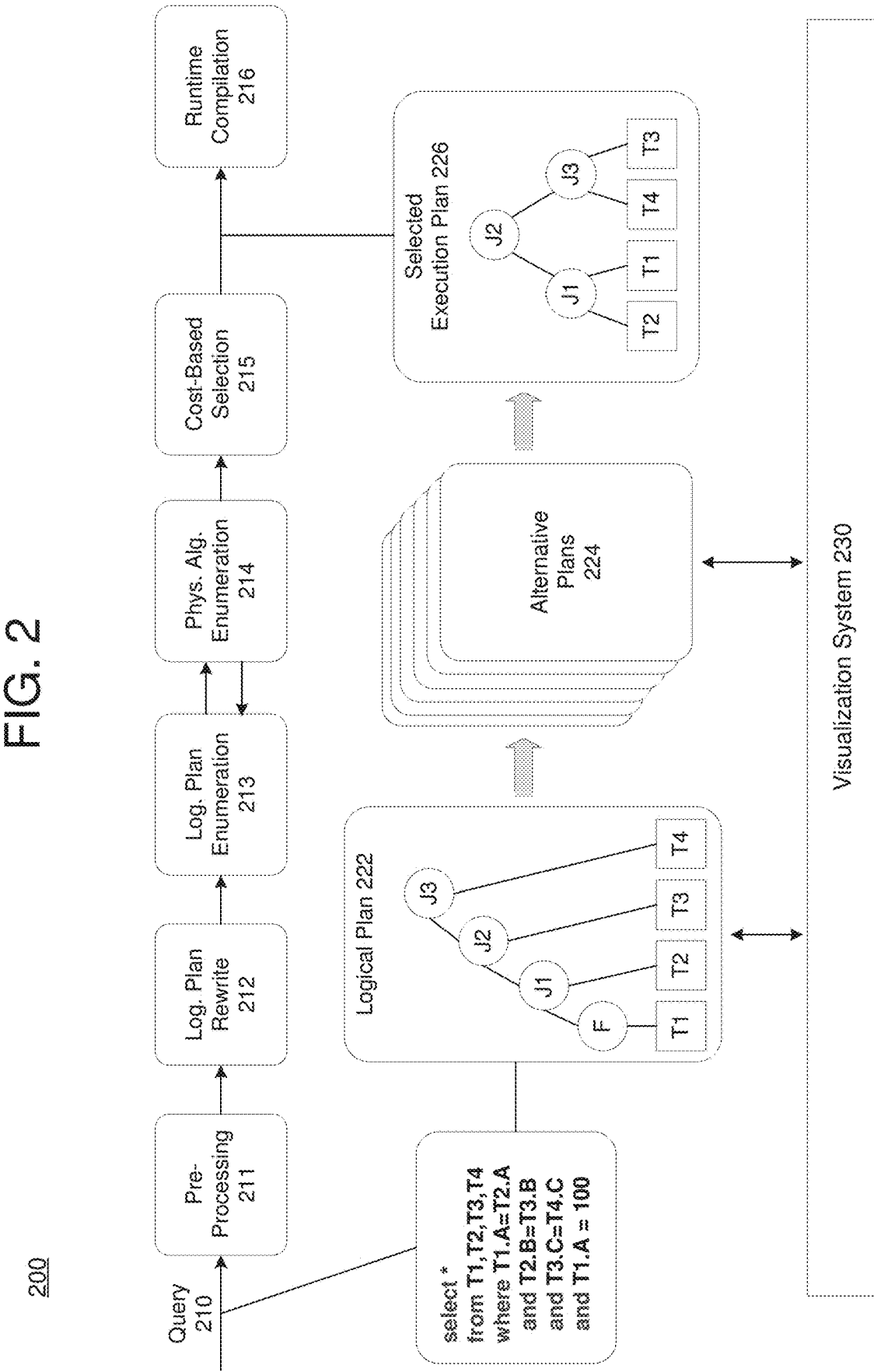
FIG. 2 is a diagram illustrating a query optimization architecture in accordance with an example embodiment.

FIG. 2 illustrates a query optimization architecture 200 in accordance with an example embodiment. Referring to FIG. 2, a database query 210 may be submitted to the database. Here, the database query 210 may include a logical execution plan 222. The submitted query 210 may be parsed by a pre-processing module 211 and passed to a query optimizer where optimization occurs. In this example, the query optimizer may be implemented by a logical plan rewriting module 212, a logical plan enumeration module 213, a physical algorithm enumeration module 214, a cost-based selection module 215, and a visualization system 230.

Figure 6:
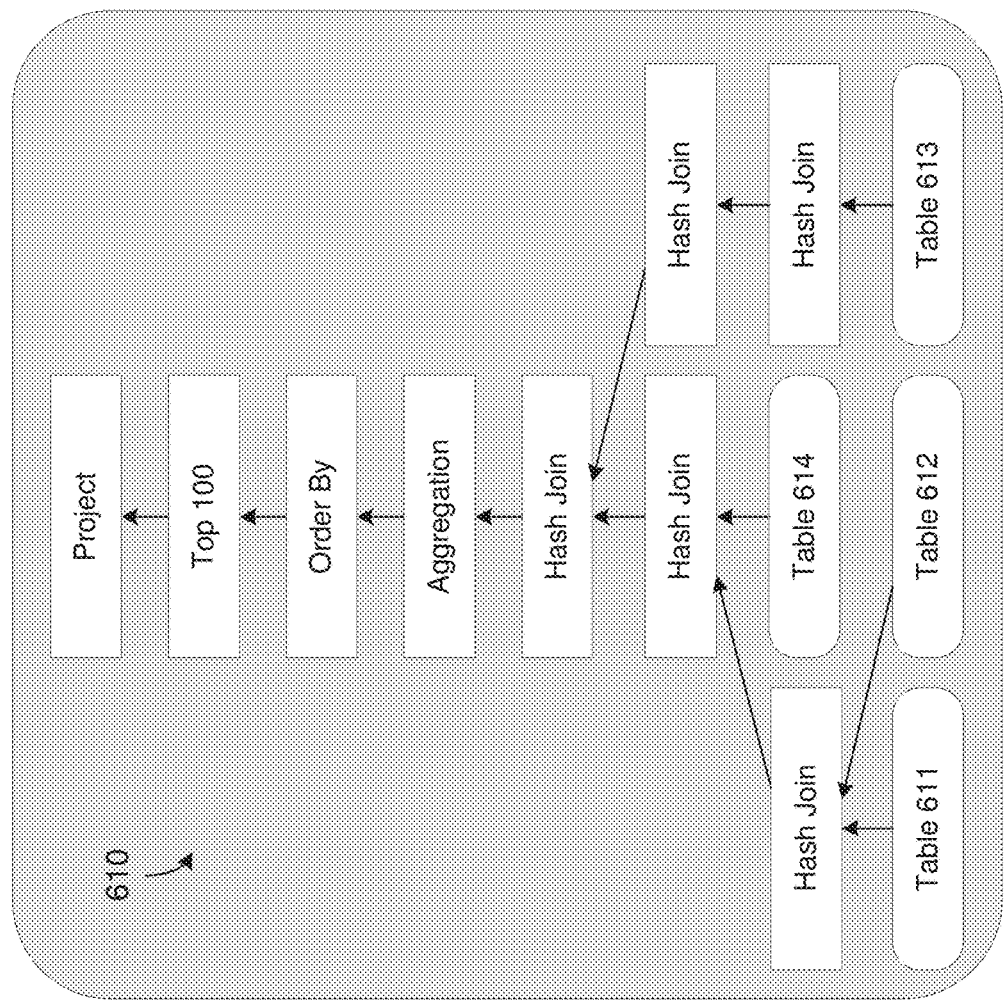
FIG. 6 is a diagram illustrating a visualization of relevant transformations of a query optimization in accordance with an example embodiment.

The logical plan rewriting module 212 creates logical execution plan 222 from an initial plan that is provided by a user query. Here, the logical plan enumeration module 213 and the physical enumeration module 214 may generate alternative execution plans 224 from the logical execution plan 222 based on transformation rules stored by either the logical plan enumeration module 213 and/or transformation rules stored by the physical algorithm enumeration module 214. The cost-based selector module 215 may estimate a cost of the alternative execution plans 224 to find and select a most optimal alternative execution plan (selected execution plan 226). The visualization system 230 may provide a user interface that enables a user to disable, enable, visualize, and rewrite enumeration rules for query optimization. The visualization system 230 may also provide a user interface which allows the user to view the results of the alternative plans being generated such as shown in the example of FIG. 5 as well as reconstructed transformation steps of the selected execution plan 226 such as shown in the example of FIG. 6. The architecture 200 may also include a compiler module 216 which can compile the selected execution plan 226 which can be executed to retrieve data from the underlying database tables identified by the query (not shown).

Figure 3:
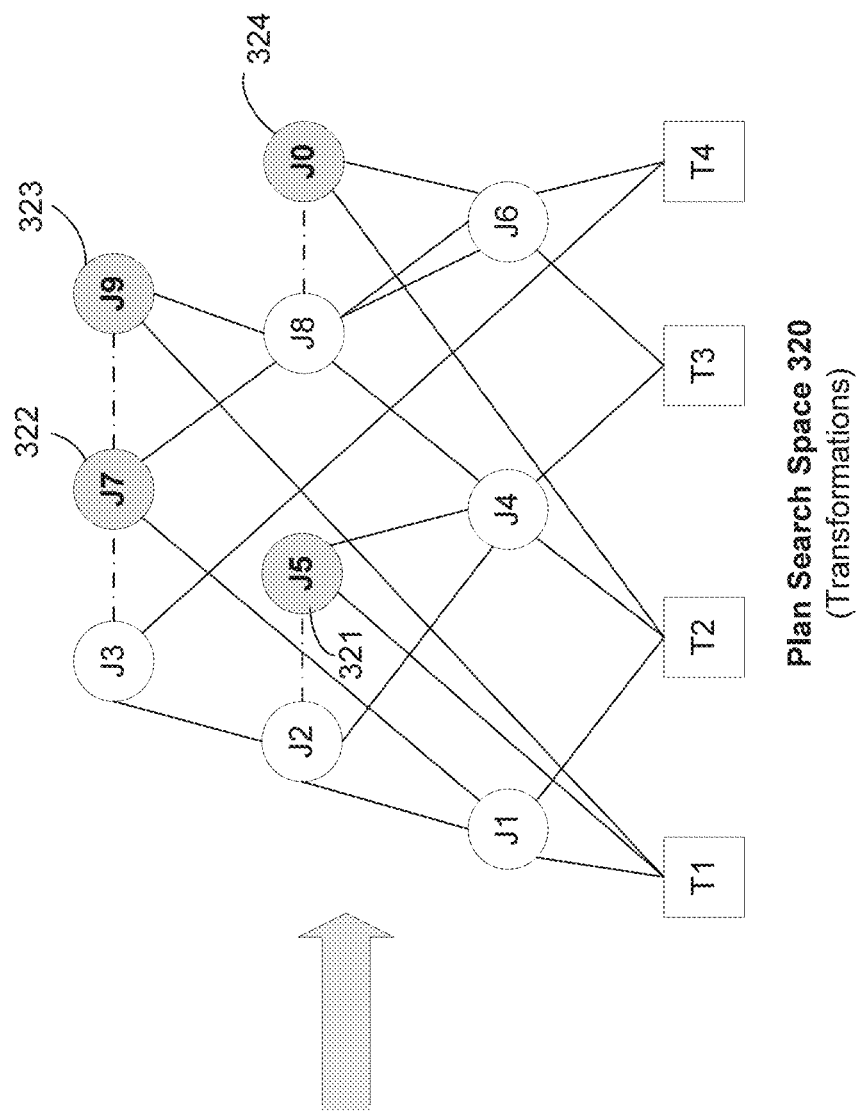
FIG. 3 is a diagram illustrating a process of transforming a logical query execution plan in accordance with an example embodiment.

FIG. 3 illustrates a process 300 of transforming a logical query execution plan 310 into a plurality of alternative query execution plans 320 in accordance with an example embodiment. Referring to FIG. 3, the initial logical execution plan 310 includes three join operations J1, J2, and J3 which are used to join data from four database tables, T1, T2, T3, and T4. In this example, the logical plan 310 includes a sequence of operations (execution steps) including first step which is a join (J1) between table T1 and table T2. The second step is a join (J2) of the result of table T1 and table T2 being joined during the first step, with table T3. The third step is a join (J3) of the result of the join created by the second step being joined with table T4.

A transformation-based optimizer uses a plan search space 320 to enumerate alternative plans. In the example of FIG. 3, the initial logical execution plan 310 includes a sequence of three join operations for joining data between four data tables. Adding an alternative plan is referred to as an enumeration or a transformation of the initial logical execution plan 310. In FIG. 3, four different the alternative plans are implemented via the plan search space 320 by adding new join operations in the shaded circles (J5, J7, J9, and J0).

Here, the query optimizer attempts several different (alternative) join operations based on various enumeration rules. In this example, a first alternative includes J5 which is a new join order. Here, the optimizer joins tables T2 and T3, first, and then joins table T1 second, and table T4, third. Each time the optimizer tries a new transformation (e.g., a new join) the system may be applying a different enumeration rule. The applications of these rules create multiple different alternative plans (transformations). In this example there are four different alternative plans are created through the plan search space 320 by four different alternative join operations 321, 322, 323, and 324. Each of these alternative plans applies a new join creating a different join order of the underlying database tables T1, T2, T3, and T4. Four alternative plans are shown here for purposes of example, however, it should be appreciated that an optimizer may create dozens, hundreds, thousands, etc. of alternative plans.

Then, the cost-based selector (215 in FIG. 2) may we choose an alternative plan with a best cost as the optimal execution plan.

Figure 4:
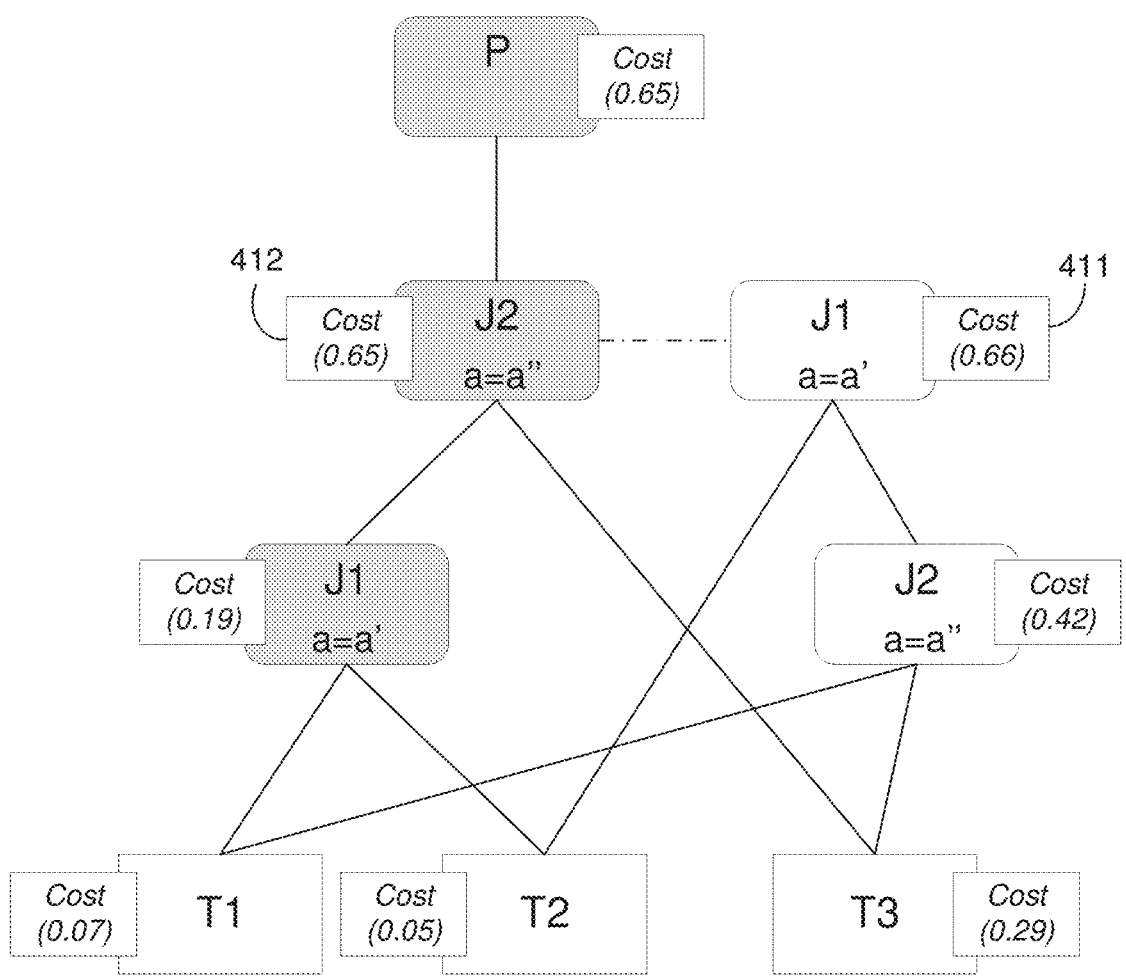
FIG. 4 is a diagram illustrating of a cost estimation process in accordance with an example embodiment.

FIG. 4 illustrates a cost estimation process 400 for determining a query cost in accordance with an example embodiment. For example, the cost estimation process 400 may be performed by the cost-based selection module 215 in FIG. 2, however, embodiments are not limited thereto. There are multiple ways of choosing a final execution plan. For example, the optimizer may choose an alternative query execution plan with a minimal estimated cost, calculated by the optimizer. As another example, a user may view the alternative query execution plans and select one manually.

Referring to FIG. 4, the SQL optimizer may calculate the accumulated cost for each nodes and compare the cost among alternatives and choose the node with minimal cost. The plan is usually referred to as the best plan or the most optimal plan. In the example of FIG. 4, a cost 412 of a join operation (J2) being performed first is less than a cost 411 of an alternative join operation (J1) being performed first. In this case, the optimizer may select J2 as the first join operation and J1 as the second join operation as a result. Query cost can be determined using various calculations which can be based on processing time, computational resources, and the like. Various query cost algorithms are known and any of these can be used by the query cost estimator of the example embodiments.

FIG. 5 illustrates a user interface 500 displaying information that is created during a query optimization process in accordance with an example embodiment. Because a query optimizer may have a very complex search space, the amount of information created during the optimization process can be difficult to understand. As a result, an end user may have difficulty understanding how an optimum query execution plan was selected from among the many alternative execution plans. The user interface 500 in FIG. 5 shows an example of some of the information that is created during the optimization process and includes statistics associated with the join operations attempted, the cost-based estimation, the limitations of the system on enumerations, expansions, prunings, and the like.

In this example, the optimizer creates 88 different transformations to an initial query execution plan (88 transformation steps) before performing a cost analysis and selecting an optimal execution plan. However, of these 88 transformation steps created by the optimizer, only a small fraction may contribute to transforming the initial execution plan into the optimal execution plan. For example, the number of transformation steps needed to create the optimal execution plan may take 10 transformation steps while the other 78 transformation steps may be irrelevant transformation steps that are not related to the selected execution plan.

FIG. 6 illustrates a user interface 600 displaying a visualization of relevant transformations which occur during a query optimization in accordance with an example embodiment. The user interface 600 includes a flow chart 610 showing an order from bottom to top of the relevant operations being applied to the initial database tables 611, 612, 613, and 614 in the selected optimal plan, and window 620 includes a listing of only the relevant rules. The system may display either of the window 620 with the relevant transformations/rules needed to create the selected query execution plan from the initial execution plan or the flow chart 610.

In this example, the listing of applied rules in the window 620 on the right side of the user interface 600 includes only the rules included in the "best plan" that is chosen by the query optimizer. Therefore, the sequence numbers are not continuous but rather sparsely identified from a much larger subset of transformations that are not show in the window 620. The flow chart 610 in the center area of the user interface 600 includes a diagram of the operations (SQL operations) performed corresponding to the transformations in the window 620. Accordingly, the system may show to the user how the final best alternative plan is created from the initial query execution plan based on the different enumeration rules (transformations) that were used by the optimizer to achieve the selected query execution plan. Furthermore, the flow chart 610 can be used to show the resulting SQL operations included in the selected query execution plan. If an SQL operation that is tested is not used, the enumeration rule that was used to create that operation is not included in the window 620. Only the rules that were needed to make the best plan are shown in the window 620.

Accordingly, the system may show the user only the effective rules and omit the irrelevant rules that were not used. Among hundreds of transformation rules being applied during a query optimization process, the system can show only a fraction of the rules that are effective transformations, and visualize each step of transformation. Starting from the initial plan, the sequence of transformations can be visualized.

FIG. 7A illustrates a process 700 in which six different transformation steps are applied to an initial query execution plan 702 during query optimization, in accordance with an example embodiment, and FIG. 7B illustrates a log 730 storing transformation steps used during the query optimization, in accordance with an example embodiment. The optimizer described herein may maintain various identifiers such as an operator ID which is a unique ID assigned for each node that appears during a query execution plan optimization process. The optimizer may assign a relation ID to each semantically meaningful nodes in the initial plan, and shared among nodes that has semantically equal or similar functionality.

In the example of FIG. 7A, three operations are included in an initial query search plan and are assigned three unique IDs (0, 1, and 2). Here, the initial operations have different levels of shading with operation 0 being white, operation 1 being slightly shaded, and operation 2 being more shaded. Each time an order of these operations is changed/transformed, the nodes that change are assigned different unique IDs however the color/shading remains the same to identify the original operation from among operations 0, 1, and 2. Here, six different transformations are performed and a sixth transformation is selected as the best query execution plan 710. According to various embodiments, the transformation rules that were used to create the query execution plan 710 from the initial execution plan 702 may be identified and output using the log 730 shown in FIG. 7B. Therefore, only those transformation rules that are relevant in creating the selected query execution plan 710 from the initial plan 702 are shown instead of the irrelevant transformation rules.

In order to create the final listing of the rules, the optimizer may assign unique IDs to the operators. Whenever a new alternative transformation is created a new unique ID can be assigned to operators that were transformed. For example, during a first transformation, a sequence of operator 1 and operator 2 switches places. Here, the optimizer may assign the unique IDs of 3 and 4 to the operators 2 and 1, respectively, which have switched places. During a second transformation, a sequence of operator 0 and operator 1 are switched. Here, the query optimizer assigns unique IDs of 5 and 6 to operators 1 and 0, respectively. This process continues in each of the following transformation steps resulting in new unique IDs being assigned to operators/nodes as they move/change in sequence. In other words, the same three operations are transformed six times into six different transformations. Each time a sequence order of an operation changes it is assigned a unique ID. Here, the operators may correspond to join operations, aggregation operations, etc.

The transformation-based optimizer reorders the operators in order to find the best plan. In this example, the sixth transformation with operator ID {13, 14, 8} is the best plan 710. A user may want to find how the plan was made. In this case, the system can show that the plan was made by applying transformation 2, 3 and 6 sequentially. In particular, transformation 2 has been created by reordering operator IDs (0 and 1) from the initial plan, transformation 3 has been created by reordering operator IDs (6 and 2) from transformation 2, and transformation 6 has been created by reordering operator IDs (5 and 7) from transformation 3. Furthermore, transformations 1, 4 and 5 (and the operator IDs therein) are irrelevant because these transformation steps do not contribute to the finally selected plan 710. According to various embodiments, the system may show the rules associated with transformations 2, 3, and 6, and prevent the rules associated with transformations 1, 4, and 5 from being shown.

FIG. 7B illustrates a logical view 720 of the transformation process 700 shown in the example of FIG. 7A. The diagram illustrates the search space generated for this example. From the initial plan, each transformation generates alternative subplans and links it as alternatives. Given that the final plan is {13, 14, 8}, the challenge of the system is to find the rule application sequence, and the plan shape at the point of each sequence. To do this, the system may implement a log 730 that includes an enumeration log 732 (transformation steps). The enumeration log 732 keeps track of the different transformations. Once the system has selected the best plan 710, the system may work backwards through the enumeration log 732 to identify the relevant transformations (and corresponding rules) associated with the most optimal plan an create a trace 734.

To reconstruct the sequence, the enumeration log 732 may be added during each transformation step shown in FIG. 7A. Each enumeration log entry contains a list of source nodes and target nodes of the transformation. For example, transformation 1 reorders node 1 and node 2, to create node 3 and node 4. In this case, log entry contains the source nodes of {1, 2} and the target nodes of {3, 4}. After the best plan is chosen, the system starts backtracking the transformation sequence using enumeration log 732 to find the effective sequence included in the trace 734 by finding the transformation rule that contributed in creating the selected plan 710.

In the examples of FIGS. 7A and 7B, the best plan is transformation 6 which includes operators {13, 14, 8}. Here, node 13 and 14 were created by transformation 6, node 8 was created by transformation 3, so the system finds that they are the effective sequence. To apply transformation 3 and 6, the system knows that node 2, 5, 6, 7 should also have been created, so the system can also track where the nodes were first created. By doing so, the system also adds sequence 2 and the initial sequence.

To reconstruct and visualize the sequence, the system may start from the first effective sequence, which should always be the initial state. The nodes in the initial state are {0, 1, 2}. Then the system moves on the next effective sequence, transformation 2, which replaces nodes {0, 1} with nodes {5, 6}. Now the plan becomes {5, 6, 2}. Then, the system moves on the next effective sequence, transformation 3, which replaces nodes {6, 2} with nodes {7, 8}. Now the plan becomes {5, 7, 8}. Then the system may move on to the final effective sequence, transformation 6, which replaces nodes {5, 7} with nodes {13, 14}. Now the plan becomes {13, 14, 8}, which is the final plan.

FIG. 8 illustrates a method 800 of generating a visualization of relevant transformations of a database query optimization in accordance with an example embodiment. For example, the method 800 may be performed by a database node, a cloud platform, a server, a computing system (user device), a combination of devices/nodes, or the like. Referring to FIG. 8, in 810, the method may include receiving a database query comprising an initial set of execution steps. For example, the database query may include a request to access data from one or more database tables of a database. The request may be based on columns, rows, table names, etc., and may include a sequence of steps to be executed which is referred to as a query execution plan. Here, the query may be a SQL query which includes an ordered sequence of steps for accessing data from one or more database tables.

In 820, the method may include generating a plurality of alternative sets of execution steps (alternative query execution plans) for the database query based on changes to the initial set of execution steps. Here, a query optimizer may generate different alternative steps based on transformation rules, also referred to as enumeration rules, by replacing one or more operations within the ordered steps. The method may include working through all possible scenarios of execution based on predefined enumeration rules. In some embodiments, the generating the plurality of alternative sets of execution steps may include generating a plurality of alternative execution plans based on transformations to a logical plan of an SQL query.

In 830, the method may include selecting an alternative set of execution steps from among the plurality of alternative sets of execution steps based on a performance of the alternative set of execution steps. For example, the method may include calculating a query cost of each alternative query execution plan using a predefined cost estimator. The cost estimator may determine a cost based on performance of the query at each operation based on computational resources consumed, processing time, and/or the like. The resulting query costs may be used to identify/select a most optimal alternative query execution plan from among a larger group/set of alternative query execution plans.

In 840, the method may include identifying transformations that are used to transform the initial set of execution steps into the selected alternative set of execution steps, and in 850, the method may include displaying information about the identified transformations via a user interface. For example, the displaying may display only those transformations that are relevant (i.e., used to generate the selected query execution plan) from among a larger set of transformations stored when creating all possible alternative query execution plans. Therefore, the irrelevant transformations (not used to create the selected alternative query execution plan) can be prevented from being displayed or otherwise ignored by the visualization.

In some embodiments, the method may include storing transformations (e.g., transformation steps, enumeration steps, etc.) for generating the plurality of alternative sets of execution steps as a log. In this example, the method may include reconstructing a sequence of transformations of the selected alternative set of execution steps based on unique identifiers assigned to the transformations stored in the log. The identifiers may be used to replay and trace through the relevant transformation steps while preventing the irrelevant transformation steps from being identified and/or visualized. In some embodiments, the method may further include compiling the database query based on the selected alternative set of execution steps and executing the compiled database query.

Figure 9:
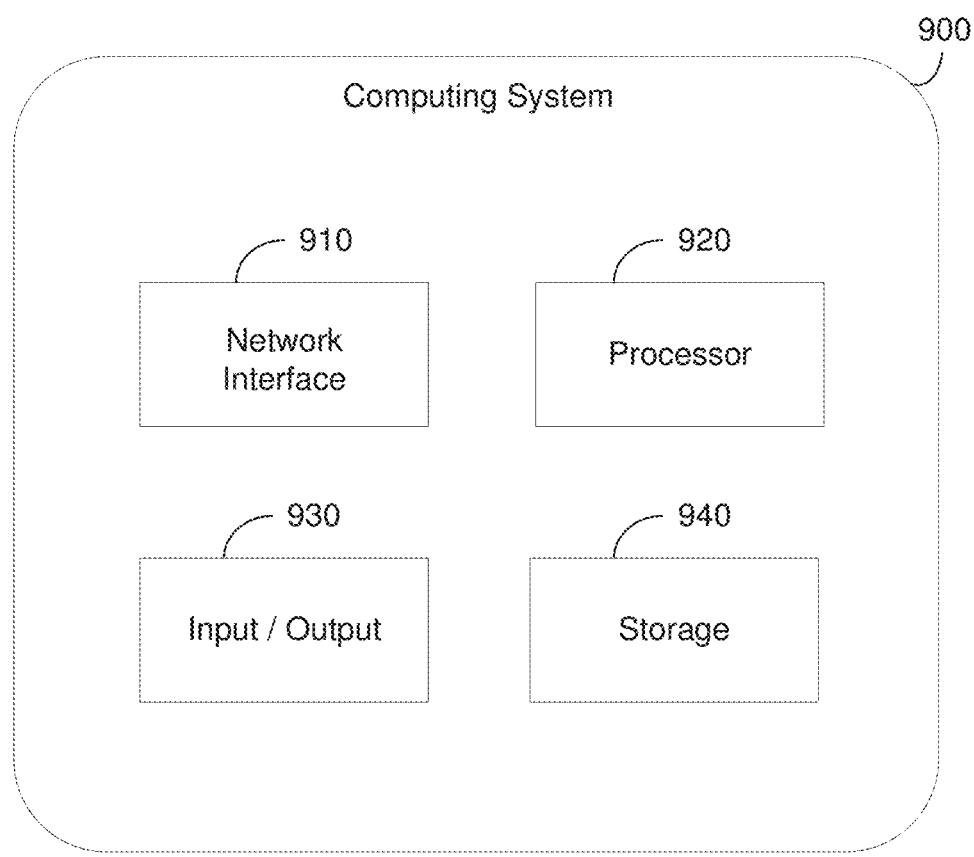
FIG. 9 is a diagram illustrating a computing system for use in the examples herein in accordance with an example embodiment.

FIG. 9 illustrates a computing system 900 that may be used in any of the methods and processes described herein, in accordance with an example embodiment. For example, the computing system 900 may be a database node, a server, a cloud platform, or the like. In some embodiments, the computing system 900 may be distributed across multiple computing devices such as multiple database nodes. Referring to FIG. 9, the computing system 900 includes a network interface 910, a processor 920, an input/output 930, and a storage device 940 such as an in-memory storage, and the like. Although not shown in FIG. 9, the computing system 900 may also include or be electronically connected to other components such as a display, an input unit(s), a receiver, a transmitter, a persistent disk, and the like. The processor 920 may control the other components of the computing system 900.

The network interface 910 may transmit and receive data over a network such as the Internet, a private network, a public network, an enterprise network, and the like. The network interface 910 may be a wireless interface, a wired interface, or a combination thereof. The processor 920 may include one or more processing devices each including one or more processing cores. In some examples, the processor 920 is a multicore processor or a plurality of multicore processors. Also, the processor 920 may be fixed or it may be reconfigurable. The input/output 930 may include an interface, a port, a cable, a bus, a board, a wire, and the like, for inputting and outputting data to and from the computing system 900. For example, data may be output to an embedded display of the computing system 900, an externally connected display, a display connected to the cloud, another device, and the like. The network interface 910, the input/output 930, the storage 940, or a combination thereof, may interact with applications executing on other devices.

The storage device 940 is not limited to a particular storage device and may include any known memory device such as RAM, ROM, hard disk, and the like, and may or may not be included within a database system, a cloud environment, a web server, or the like. The storage 940 may store software modules or other instructions which can be executed by the processor 920 to perform the method shown in FIG. 8. According to various embodiments, the storage 940 may include a data store having a plurality of tables, partitions and sub-partitions. The storage 940 may be used to store database records, items, entries, and the like.

According to various embodiments, the storage 940 may store a database query comprising an initial set of execution steps. The processor 920 may generate a plurality of alternative sets of execution steps for the database query based on changes to the initial set of execution steps. In this example, the processor 920 may select an alternative set of execution steps from among the plurality of alternative sets of execution steps based on a performance of the alternative set of execution steps. In some embodiments, the processor 920 may identify transformations that are used to transform the initial set of execution steps into the selected alternative set of execution steps, and display information about the identified transformation steps via a user interface.

According to various embodiments, the database query may include an ordered sequence of steps for accessing data from one or more database tables. In some embodiments, the processor 920 may store transformations for generating the plurality of alternative sets of execution steps as a log stored in the storage. In this example, the processor 920 may reconstruct a sequence of transformations of the selected alternative set of execution steps based on unique identifiers assigned to the transformations stored in the log. In some embodiments, the processor 920 may select an optimal alternative set of execution steps from the plurality of alternative sets of execution steps based on query costs of the respective plurality of alternative sets of execution steps.

In some embodiments, the processor 920 may prevent irrelevant transformations that are used to transform the initial set of execution steps into non-selected alternative sets of execution steps from being displayed. For example, the plurality of alternative sets of execution steps may include a plurality of alternative execution plans that are generated by the processor based on transformations to a logical plan of an SQL query. In some embodiments, the processor 920 may compile the database query based on the selected alternative set of execution steps and execute the compiled database query.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage to store a database query comprising an initial query execution plan that includes an initial set of execution steps which are assigned an initial sequence of identifiers, respectively; and
   a processor configured to
      transform the initial query execution plan into a plurality of alternative sets of execution steps for the initial query execution plan, wherein the processor applies a sequence of transformations to the initial query execution plan to create the plurality of alternative sets of execution steps,
      assign different sequences of identifiers to the execution steps each time a transformation is applied, respectively, and store the assigned different sequence of identifiers in a log, wherein the assigning comprises reusing an identifier for a step when the step remains unchanged as a result of the transformation being applied, and changing identifiers of steps that are changed as a result of the transformation being applied;
      select an alternative set of execution steps from among the plurality of alternative sets of execution steps in the log based on a performance of the alternative set of execution steps,
      reconstruct a list of identifiers of transformation operations that are applied to the initial set of execution steps to transform the initial set of execution steps into the selected alternative set of execution steps by backtracking through the log based on one or more reused identifiers assigned to the selected alternative set of execution steps, and
      display at least a portion of the reconstructed list of identifiers via a user interface.

2. The computing system of claim 1, wherein the database query comprises a structured query language (SQL) query comprising an ordered sequence of steps for accessing data from one or more database tables.

3. The computing system of claim 1, wherein the processor is further configured to trace an order of execution steps that remain after each transformation in the sequence of transformations and store each traced order in the log.

4. The computing system of claim 1, wherein the processor is configured to select an optimal alternative set of execution steps from the plurality of alternative sets of execution steps based on query costs of the respective plurality of alternative sets of execution steps.

5. The computing system of claim 1, wherein the processor prevents a subset of transformations that are used to transform the initial set of execution steps into non-selected alternative sets of execution steps from being displayed.

6. The computing system of claim 1, wherein the plurality of alternative sets of execution steps comprise a plurality of alternative execution plans that are generated by the processor based on transformations to a logical plan of an SQL query.

7. The computing system of claim 1, wherein the processor is further configured to compile the database query based on the selected alternative set of execution steps and execute the compiled database query.

8. A method comprising:
   receiving a database query comprising an initial query execution plan that includes an initial set of execution steps which are assigned an initial sequence of identifiers, respectively;
   transforming the initial query execution plan into a plurality of alternative sets of execution steps for the initial query execution plan, wherein the transforming comprises applying a sequence of transformations to the initial query execution plan to create the plurality of alternative sets of execution steps;
   assigning different sequences of identifiers to the execution steps each time a transformation is applied, respectively, and storing the assigned different sequence of identifiers in a log, wherein the assigning comprises reusing an identifier for a step when the step remains unchanged as a result of the transformation being applied, and changing identifiers of steps that are changed as a result of the transformation being applied;
   selecting an alternative set of execution steps from among the plurality of alternative sets of execution steps in the log based on a performance of the alternative set of execution steps;
   reconstructing a list of transformation operations that are applied to the initial set of execution steps to transform the initial set of execution steps into the selected alternative set of execution steps by backtracking through the log based on one or more reused identifiers assigned to the selected alternative set of execution steps; and
   displaying at least a portion of the reconstructed list of identifiers via a user interface.

9. The method of claim 8, wherein the database query comprises a structured query language (SQL) query comprising an ordered sequence of steps for accessing data from one or more database tables.

10. The method of claim 8, further comprising tracing an order of execution steps that remain after each transformation in the sequence of transformations and storing the traced order in the log.

11. The method of claim 8, wherein the selecting comprises selecting an optimal alternative set of execution steps from the plurality of alternative sets of execution steps based on query costs of the respective plurality of alternative sets of execution steps.

12. The method of claim 8, wherein the identifying further comprises preventing a subset of transformations that are used to transform the initial set of execution steps into non-selected alternative sets of execution steps from being displayed.

13. The method of claim 8, wherein the generating the plurality of alternative sets of execution steps comprises generating a plurality of alternative execution plans based on transformations to a logical plan of an SQL query.

14. The method of claim 8, further comprising compiling the database query based on the selected alternative set of execution steps and executing the compiled database query.

15. A non-transitory computer-readable medium comprising instructions which when executed by a processor cause a computer to perform a method comprising:

receiving a database query comprising an initial query execution plan that includes an initial set of execution steps which are assigned an initial sequence of identifiers, respectively;

transforming the initial query execution plan into a plurality of alternative sets of execution steps for the initial query execution plan, wherein the transforming comprises applying a sequence of transformations to the initial query execution plan to create the plurality of alternative sets of execution steps;

assigning different sequences of identifiers to the execution steps each time a transformation is applied, respectively, and storing the assigned different sequence of identifiers in a log, wherein the assigning comprises reusing an identifier for a step when the step remains unchanged as a result of the transformation being applied, and changing identifiers of steps that are changed as a result of the transformation being applied;

selecting an alternative set of execution steps from among the plurality of alternative sets of execution steps in the log based on a performance of the alternative set of execution steps;

reconstructing a list of transformation operations that are applied to the initial set of execution steps to transform the initial set of execution steps into the selected alternative set of execution steps by backtracking through the log based on one or more reused identifiers assigned to the selected alternative set of execution steps; and displaying at least a portion of the reconstructed list of identifiers via a user interface.

16. The non-transitory computer-readable medium of claim 15, wherein the database query comprises a structured query language (SQL) query comprising an ordered sequence of steps for accessing data from one or more database tables.

17. The non-transitory computer-readable medium of claim 15, wherein the method further comprises tracing an order of execution steps that remain after each transformation in the sequence of transformations and storing each traced order in the log.

18. The computing system of claim 1, wherein the processor is further configured to prevent identifiers of a subset of transformation operations from being displayed via the user interface.

* * * * *